3,399,157
STABILIZATION OF ETHYLENE/VINYL
CHLORIDE LATICES
Oliver de S. Deex, Clayton, and Charles E. Miles, Ballwin, Mo., assignors to Monsanto Company, St. Louis, Mo., a corporation of Delaware
No Drawing. Filed Jan. 6, 1965, Ser. No. 423,857
12 Claims. (Cl. 260—29.6)

This invention relates to ethylene/vinyl chloride latices. In a major aspect, this invention relates to an improved method for stabilizing ethylene/vinyl chloride latices having at least 35% by weight dispersed solids in the latex.

Ethylene/vinyl chloride (E/VCl) latices having about 20% by weight solids have been prepared by prior art workers. Latices with this level of solids content, however, are not suitable for use as commerical pigment binders or for commercial coating operations, especially for coatings on cellulosic materials. To be commercially satisfactory as a pigment binder or paper coating, the E/VCl latex should have at least 35% by weight, and preferably at least 40% by weight, dispersed solids in the latex. Success in preparing E/VCl latices is reported in copending patent application Ser. No. 422,030, now U.S. Patent 3,031,318 and Ser. No. 422,004, filed Dec. 29, 1964. Briefly, the process as described therein encompasses the production of stable E/VCl latices by adding to the ethylene/vinyl chloride monomer system a specified percentage of the theoretical amount necessary to provide a monomolecular layer on the polymer solids, of an anionic or nonionic emulsifying agent, and subsequently polymerizing the monomers to form an aqueous emulsion of polymer in water. Latices prepared in the manner described in the above-identified patent applications are characterized in some of their preferred aspects by Maron stability values of one gram of coagulum or less after a 30 minute test period.

It is a primary object of this invention to provide a method for improving mechanical stability for ethylene/vinyl chloride latices. Additional objects, benefits, and advantages will become apparent as the detailed description of the invention proceeds.

It has now been discovered that stability of E/VCl latices can be improved even further by adding only a portion of the desired amount of emulsifying agent to the reaction mixture prior to the initiation of polymerization and adding a second portion to the reaction mixture after the polymerization is completed.

Stability of the resultant latex is conveniently measured by the Maron stability test. This test is adequately described in Maron and Ulevitch, Mechanical Stability Test for Rubber Latices, Anal. Chem. 25, 1087 (1953). In general this test measures the ability of a latex to resist coagulation when subjected to a shearing force. For purposes of this discussion, samples tested for thirty minutes according to the Test Procedure described on page 1088 of the Maron et al. article are considered stable if the amount of coagulum formed does not exceed one gram. Using the process of the present invention, the Maron stability can be lowered significantly by comparison to Maron stability values for latices prepared by other processes.

Techniques described herein permit the preparation of stable latices having from 35% up to about 60% by weight dispersed solids. Preferably, this method is used to prepare E/VCl latices having from about 40% up to about 55% by weight dispersed solids, and more preferably from about 40% up to about 50% dispersed solids.

Our method can be adapted to produce any proportion of ethylene to vinyl chloride in the emulsified copolymer from a 99:1 ratio of ethylene to vinyl chloride to a 1:99 ratio of ethylene to vinyl chloride. Of greatest value for the uses presently envisioned and most easily prepared at the preferred reaction conditions of this process are E/VCl copolymers containing from about 60% to about 85% by weight polymerized vinyl chloride.

The stable E/VCl latices having at least 35% dispersed solids are further characterized by a particle size of the emulsified copolymer from about 500 to about 3000 angstroms, preferably from about 1000 to 2000 angstroms (number average particle size as measured by electron microphotographs) or from 1400 to 2300 angstroms (weight average particle size as measured by light scattering). Latices containing solids within these particle size ranges are capable of acquiring the high stability desirable for the preferred uses of the latex. For other uses not requiring a high degree of latex stability, particle sizes of an E/VCl latex can fall outside the above ranges.

Because of the different reactivity ratios of ethylene and vinyl chloride, monomeric vinyl chloride enters an E/VCl copolymer at a faster rate than does ethylene. The proportions of monomers in the feed necessary to produce a polymer of a given composition will vary depending upon the temperature and pressure of reaction, the specific catalyst system employed, the pH of the reaction system, and other variables. At a pressure of 3000 to 3500 p.s.i., a temperature of 30 to 32° C., using a persulfate-ferrous iron-sulfoxylate catalyst-initiator system buffered to a pH of 8 to 10, the following is a tabulation of some monomer feed ratios with the corresponding polymer ratios.

| Percent weight E:VCl in monomer feed | will produce | Percent weight E:VCl in polymer product |
|---|---|---|
| 50:50 | | 17:83 |
| 60:40 | | 25:75 |
| 70:30 | | 30:70 |
| 80:20 | | 40:60 |
| 85:15 | | 45:55 |

Other proportions of monomer feed which will produce a desired polymer product will be obvious in view of the foregoing and in view of the specific examples set forth below.

Any system capable of generating free radicals in an aqueous medium can be used in the production of the E/VCl latices of this invention. Preferred is a redox system, more explicitly a reduction-oxidation system, which provides the initiation and catalysis for the E/VCl copolymerization. A suitable redox system used herein consists of an oxidizing agent, a reducing agent, a multivalent metal compound (complexed if necessary so as to remain in solution), and an alkaline buffer. Suitable oxidizing agents include hydrogen peroxide, the inorganic persulfates such as potassium peroxydisulfate, sodium peroxydisulfate, and ammonium peroxydisulfate, the organic hydroperoxides such as cumene hydroperoxide and tert-butyl hydroperoxide, and the alkali metal and ammonium perborates. The amount of oxidizing agent which can be used ranges from about 0.01% to about 10% by weight, and preferably from about 0.1% to about 5%, of the monomer feed.

The reducing agents of this system must be capable of reducing a multivalent metal ion from a higher to a lower oxidation state. Examples of reducing agents include sodium, potassium, and ammonium sulfites, thiosulfates, sulfoxylates, bisulfites, and hydrosulfites. A particularly preferred reducing agent for use herein is sodium formaldehyde sulfoxylate. The amount of reducing agent is dependent upon the amount of oxidizing agent employed. Generally, an amount of reducing agent molecularly equivalent to the amount of oxidizing agent is required. This rule is subject to variation depending upon the particular combination of individual reducing and oxidizing agents.

For instance, in a potassium peroxydisulfate-sodium formaldehyde sulfoxylate system, it has been determined that only 0.7 equivalent of sulfoxylate per equivalent of peroxydisulfate is necessary. In such a case, the concentration of sulfoxylate can range from 0.7 to 1.0 equivalent per equivalent of peroxydisulfate.

Inclusion of a multivalent metal compound into the peroxydisulfate-sulfoxylate and other related redox systems leads to faster polymerization rates and higher conversions than are obtained in the absence of the multivalent metal compound. If fast rates and high conversions can be sacrificed, the metal compound can be excluded from several redox systems. The multivalent metal compound as used in the redox system under discussion refers to metallic salts in which the metal ion is capable of existing in at least two different valence states. Examples of such compounds include water-soluble salts of iron, cobalt, nickel, copper, zinc, silver, and gold. Frequently the metal is complexed with a sequestering agent to keep the metal ions in solution under the basic conditions employed. This is accomplished by addition of a compound such as an alkali metal ethylenediaminetetraacetate to the aqueous solution. The metal salt added to the redox system contains the metallic ion in its higher oxidation state to prevent its immediate reaction with the oxidizing agent of the system. In a preferred embodiment, ferric ammonium sulfate is utilized in conjunction with sodium ethylenediaminetetraacetate to provide ferric versenate for the redox system. The concentration of multivalent metal ranges from about 0.0001% to about 0.1% by weight, and preferably from about 0.001% to about 0.01%, of the monomer feed.

The buffer used herein can be any water-soluble basic compound whose 0.1 molar solution has a pH from about 7 to about 12 preferably from about 8 to about 11. Examples of compounds include borax, sodium carbonate, sodium bicarbonate, potassium tartrate, sodium citrate, and ammonium hydroxide. The amount of buffer required for the process utilized herein is that amount necessary to maintain the pH of the reaction mixture between 7 and 12, preferably pH 8 or 9. In a preferred embodiment using ammonium hydroxide as the buffering agent, a suitable concentration of buffer is from about 0.01% to about 10% by weight, and preferably from 0.1% to about 1.0%, of the monomer feed.

Water is a necessary component of our polymerization system. The amount of water can vary widely however, depending upon the solids content desired in the finished latex. The solids content is dependent upon the quantity of monomer feed introduced into the system and the percent conversion, which is in turn dependent upon several of the above-described variables. In preferred embodiments, formulations containing water from about 50% to about 250% of the monomer feed have been used.

The emulsifying agent is an essential component of our disclosed process if the process is to be capable of producing a stable E/VCl latex having 35% or more dispersed solids. Acceptable for use herein are those anionic surfactants having an HLB value of at least 10, preferably from about 13 to about 40, and more preferably from about 14 to about 17. The term "HLB" is discussed in Griffin, Classification of Surface-Active Agents by HLB, J. Soc. Cosmetic Chemists, 1, No. 5, p. 311 to 326 (1949). Briefly the HLB value indicates the hydrophilic-lipophilic balance of an emulsifier. Most of the commonly encountered anionic and nonionic surface-active agents lie in an HLB range from one to twenty where a value of one indicates a high degree of oil solubility and a value of twenty indicates high water solubility. Examples of suitable anionic emulsifiers include sodium dodecylbenzenesulfonate, sodium decylbenzenesulfonate, ammonium laurylbenzenesulfonate, potassium stearylbenzenesulfonate, sodium stearyl sulfate, potassium myristylnaphthalenesulfonate, ammonium dodecylphenoxypolyoxyethylene ethyl sulfate, sodium lauryl sulfate, nonylphenoxyacetic acid, sulfated cresylic acid, disodium N-octadecylsulfosuccinamate, tetrasodium N-(1,2-dicarboxyethyl)-N-octadecylsulfosuccinamate, diamyl ester of sodium sulfosuccinic acid, dihexyl ester of sodium sulfosuccinic acid, bis-(tridecyl)ester of sodium sulfosuccinic acid, dioctyl sodium sulfosuccinate, sodium, potassium and ammonium salts of fatty acids, sodium dodecyldiphenyloxide disulfonate, benzene potassium sulfonate, sodium salt of a sulfonated naphthalene-formaldehyde condensate, sodium salt of polyethoxy alkyl phenol sulfonate, sodium oleyl methyl, tartrate, and triethanolamine salt of polyethoxy alkyl phenol sulfonate.

Also included for use herein are nonionic surfactants having an HLB value of from about 10 to about 17, preferably from about 13 to about 17, and more preferably from about 14 to about 17. Examples of suitable nonionic emulsifiers include alkyl aryl polyether alcohols such as lauryl phenyl polyether ethanol, alkanol amine fatty condensates such as triethanolamine, coconut fatty acid ethanolamide, lauric acid propanolamide, fatty alcohol polyglycol ether, myristyl phenyl polyglycol ether, glycerol sorbitan laurate, polyoxyethylene sorbital hexaoleate, polyoxyethylene sorbital septaoleate, polyoxylene sorbital oleate laurate, a blend of sorbitan monostearate and polyoxyethylene stearate, fatty esters of polyethylene glycol, glycolamido stearate, propylene glycol monostearate, alkylphenol polyglycol ethers containing from 2 to 40 moles of ethylene oxide per mole of ether, and alkanol polyglycol ethers containing from 2 to 40 moles of ethylene oxide per mole of ether.

The concentration of emulsifier is much more restrictive than suitable concentration ranges for the other components of the polymerization system under discussion. A preferred concentration of emulsifier is largely determined by the emulsifier's ability to coat a certain percentage of the polymer particle's surface with a monomolecular film. One meaningful limitation of emulsifier concentration is a range based upon the weight of the polymer particles formed during the polymerization. Generally, the amount of emulsifier used for the pre-polymerization addition can range from about 1% to about 8% by weight of the polymer particles subsequently to be formed. The post-polymerization addition of emulsifier can be such that the total concentration of emulsifier ranges from about 2% to about 15%, preferably from about 4% to about 10%, by weight of the polymer solids. Expressed in this manner, it can be understood that any concentration range of emulsifying agent based upon the polymer product is dependent upon the covering efficiency of the emulsifier, the particle size of the latex solids and the degree of monodispersion among the latex solids. If the concentration of emulsifier is expressed as a percentage of the monomer feed, another variable of percent conversion must be considered.

It can therefore be appreciated that numerical emulsifier concentration ranges are subject to considerable variation depending upon properties of the latex being stabilized. More meaningful than numerical limits, therefore, is a limitation based upon the amount of emulsifier necessary to provide a partial monomolecular coating for the polymeric solids. In U.S. patent applications Ser. Nos. 422,004 and 422,030, now U. S. Patent 3,031,318, a limitation of a specified percentage of the amount necessary to provide a monomolecular layer over the polymer solids is set forth. Since the present process employs a post-polymerization addition of emulsifier, the total quantity of emulsifier can exceed the limits set forth in the copending patent applications cited above. This is because the upper limit of emulsifier in a process not embodying a post-polymerization addition is determined by the rate of polymerization and ease of latex separation desired. Too much emulsifier causes foaming of the reaction mixture, thereby retarding the polymerization and producing a latex which can be separated from the reaction residues only with considerable difficulty. When a pre-polymerization and post-polymerization addition are employed, however, only the first addition is limited by the necessity for satisfactory polymerization rates and ease of latex separation; the second addition, after the polymerization is completed and the latex separated, is not so restricted and in fact can be any amount which, when combined with the pre-polymerization addition, totals up to 50% in excess of the amount of emulsifier necessary to provide a monomolecular coating on the polymer solids. It has been determined that the pre-polymerization addition of emulsifier should be limited to from about 15% to about 95% of the amount of emulsifier necessary to provide a monomolecular coating on the polymer solids. Preferably, the pre-polymerization addition of emulsifier ranges from about 25% to about 75% of the amount necessary to provide the above-mentioned monomolecular layer. Total emulsifier concentration including both pre- and post-polymerization additions can extend from about 25% up to about 150% of the monomolecular layer limit. In preferred aspects of this invention, the total emulsifier concentration will range from about 50% up to about 100% of the amount necessary to provide a monomolecular coating on the polymer solids.

Quantities of emulsifier necessary to provide a given percentage of a monomolecular layer on the polymer solids is conveniently determined by calculating the surface area of the polymer particles according to the formula $$\text{surface area of polymer solids} = \frac{(6)(\text{weight of polymer solids})}{(\text{density of polymer solids}) \times (\text{diameter of polymer particles})}$$

The surface area of an E/VCl polymer covered by a quantity of emulsifier is determined according to the formula $$\frac{\text{area in sq. angstroms}}{\text{gram of emulsifier}} = \frac{(A)(6.02 \times 10^{23})}{\text{mol wt. of emulsifier}}$$

where $A$=area in sq. angstroms covered by one molecule of emulsifier. This area of coverage is largely a matter of empirical determination which can vary depending upon the concentration of the emulsifier and other factors. It has been found that sodium dodecylbenzenesulfonate and polyoxyethylene nonylphenol having about 10 moles of ethylene oxide per mole of nonylphenol have a molecular coverage of about 60 sq. angstroms per molecule. Molecular coverages of other emulsifiers are known to those skilled in the art and can be determined according to techniques described in Harkins, Journal of the American Chemical Society, 69, 1428 (1947).

When an anionic emulsifying agent is used for the pre-polymerization addition, a water-soluble electrolyte is added to the reaction mixture to minimize gel formation and coagulation of the latex solids. Any water-soluble neutral or basic inorganic compound can be used for this purpose. Preferred are those compounds whose 0.1 molar solutions have a pH from about 7 to 10. An example of a particularly preferred electrolyte is sodium pyrophosphate. Other acceptable electrolytes include sodium chloride, ammonium hydroxide, ammonium nitrate, potassium sulfate, potassium tetraborate, and ammonium chloride. It will be recognized that the buffer can also function as the gel-stabilizing electrolyte if a sufficient amount is present. However, even in those cases where sufficient buffer is available to satisfy the requirement for an electrolyte, it may nevertheless be desirable to use sodium pyrophosphate because of its special value as a decoagulant. Suitable concentration ranges of electrolyte are from about 0.01% to about 10% by weight, preferably from about 0.1% to about 10%, of the monomer feed. The optimum concentration is dependent to some extent upon the particular electrolyte and upon its degree of ionization.

Examples of buffers, oxidizing agents, reducing agents, electrolytes and complexing agents given above have all been various sodium, potassium or ammonium salts. The use of such compounds for this process is suggested because of their water solubility and because of their compatibility with the emulsifying agents used herein. If, however, the presence of water-insoluble soaps can be tolerated in the E/VCl latices, it is possible by adjustment of the concentrations of the emulsifying agents and of the various salts to utilize salts of other metals, such as the corresponding salts of iron, copper, zinc, mercury, magnesium and calcium.

Reaction temperatures can range from about $-10°$ to about $75°$ C., preferably from about $25°$ to $50°$, and more preferably, when used in conjunction with preferred components and pressures, from about $30°$ to $35°$ C. At polymerization temperatures below $25°$ C., it is advantageous to include a small quantity (about 10% of the water present) of a lower alkyl alcohol such as methanol or ethanol to prevent hydrate formation of the monomer feed.

Reaction pressures are superatmospheric and can vary from less than 500 to more than 35,000 p.s.i. A preferred range is from about 700 to about 6,000 p.s.i., particularly from about 800 to about 4,000 p.s.i. During polymerization with its consequent conversion of gaseous monomers to solid polymer, the pressure is maintained within the desired limits by injection of water or monomers, usually by injection of vinyl chloride.

In the optimization of the present process, stirring rates are of significant importance. Too little stirring gives lower polymerization rates; too much stirring results in partial coagulation of the latex solids. The proper stirring rate is of course dependent upon the size and shape of the reaction vessel in relation to the size, shape and placement of the stirrer blade. Using a one gallon autoclave with inside dimensions of 12 x 5 inches in diameter together with three four-bladed turbines, each turbine being 2 inches in diameter and one inch high, and each turbine being spaced equidistantly along the length of the reactor, we have found that a stirring rate of 400 to 700 r.p.m. is satisfactory for our purposes. One skilled in the art will be advised to vary or utilize this stirring rate depending upon the particular configuration of his apparatus.

The addition of emulsifier after completion of the polymerization can be made at any time, either before or after removal of the latex from the reactor or both. Addition of emulsifier to the latex before its removal from the reactor usually results in less coagulum formation but can also cause foam carryover of the latex with the monomer upon venting. In much of the work described herein, it has been found advantageous to add the second quantity of emulsifier before venting the unreacted monomer. The increased loss of latex through foam carryover has usually been offset by less coagulum formation resulting in a latex of higher solids content.

The above description will be more clearly understood when studied in conjunction with the following specific examples which set forth some of the preferred embodiments of the present invention.

Maron stability values reported in the following examples were obtained according to the test procedure described in the Maron et al. article with the following exceptions: the test procedure used herein used a 1.5 inch diameter rotor with a 40 gram sample instead of a 2 inch rotor with a 75 gram sample.

Example 1

To an evacuated one gallon autoclave is added 1400 ml. of an aqueous solution containing 25 grams of tetrasodiumpyrophosphate,
8 grams of ammonium peroxydisulfate,
14 ml. of 15 N ammonium hydroxide,
46 grams of sodium dodecylbenzenesulfonate, and
14 ml. of a 0.1 molar solution of ferric versenate.

The vessel is warmed to $30°$ C., at which time 790 grams of ethylene and 340 grams of vinyl chloride are added with stirring. The pressure inside the reaction vessel is 3000 p.s.i. and is maintained at this level by addition of vinyl chloride during the polymerization. The polymerization is started by adding 3.7 ml. of a 10% sodium formaldehyde sulfoxylate solution and is maintained by addition of 1.8 ml. portions at 15 minute intervals. The mixture is stirred at 650 r.p.m. during the entire polymerization. Over a four hour period a total of 30.3 additional ml. of sulfoxylate solution and 563 additional grams of vinyl chloride are added to the reaction vessel. After expiration of the four hour period, stirring is discontinued and the latex allowed to separate from the unreacted monomer. The reactor is then vented slowly to 500 p.s.i., at which time 1 ml. of a defoaming agent is added. The latex is subsequently vented to atmospheric pressure and the latex drained from the bottom of the vessel. A total of 2457 grams of latex having 840 grams of copolymer solids is obtained. This represents a latex having 40.6% solids. The polymerized vinyl chloride content of the copolymer is 71%; percent conversion is 50% by weight based on the total monomer feed; specific viscosity is 0.09 (0.1% tetrahydrofuran at 30° C.); weight average particle size of the latex solids is 1100 angstroms; Maron stability of the latex is 0.9 gram.

The following examples set forth results achieved by adding small amounts of specified emulsifiers to the latex of Example 1.

| Example No. | Emulsifier | Quantity added, percent wt. on polymer | Total emulsifier concentration on polymer, percent wt. | Maron stability, grams/ 30 min. |
|---|---|---|---|---|
| 2 | Polyoxyethylene nonylphenol with 13 moles of EO/mole of nonylphenol (Sterox NM). | 2.7 | 8 | .003 |
| 3 | Polyoxyethylene nonylphenol with 13 moles of EO/mole of nonylphenol. | 1.7 | 7 | .009 |
| 4 | do | 1.2 | 6.5 | .230 |
| 5 | Benzyl ether of octylphenol ethylene oxide adduct (Triton CF-10). | 1.7 | 7 | .005 |
| 6 | do | 1.2 | 6.5 | .009 |
| 7 | do | 0.7 | 6 | .143 |
| 8 | Polyoxyethylene nonylphenol with 10 moles of EO/mole of nonylphenol (Sterox NJ). | 1.7 | 7 | .015 |
| 9 | Polyoxyethylene nonylphenol with 10 moles of EO/mole of nonylphenol. | 1.2 | 6.5 | .098 |
| 10 | do | 0.7 | 6 | .365 |
| 11 | Ammonium dodecylbenzene sulfonate. | 1.7 | 7 | .003 |
| 12 | do | 1.2 | 6.5 | .010 |
| 13 | do | 0.7 | 6 | .053 |
| 14 | 4:9 mixture of sodium dodecylbenzenesulfonate: low mol. wt. polyvinyl alcohol. | 1.7 | 7 | .003 |
| 15 | do | 0.7 | 6 | 0.34 |

Example 16

To an evacuated one gallon autoclave is added 1,910 ml. of an aqueous solution containing 13 grams of sodium carbonate,
26 grams of potassium peroxydisulfate,
13 ml. of 15 N ammonium hydroxide,
12 ml. of a 0.1 molar solution of ferric versenate, and
90 grams of polyoxyethylene nonylphenol having 10 moles of ethylene oxide per mole of nonylphenol.

The vessel is warmed to 30° C., at which time 644 grams of ethylene and 276 grams of vinyl chloride are added with stirring. The pressure inside the reaction vessel is 3000 p.s.i. and is maintained at this level by addition of vinyl chloride during the polymerization. The polymerization is started by adding 4.6 ml. of a 20% sodium formaldehyde sulfoxylate solution and is maintained by addition of 1.3 ml. portions at 15 minute intervals. The mixture is stirred at 400 r.p.m. during the entire polymerization. Over a eight hour period a total of 44.7 additional ml. of sulfoxylate solution and 869 additional grams of vinyl chloride are added to the reaction vessel. After expiration of the eight hour period, stirring is discontinued and the latex allowed to separate from the unreacted monomer. The latex is vented to atmospheric pressure and the latex drained from the bottom of the vessel. A total of 3480 grams of latex having 1425 grams of copolymer solids is obtained. This represents a latex having 46% solids. The polymerized vinyl chloride content of the copolymer is 66%; percent conversion is 80% by weight based on the total monomer feed; specific viscosity is 0.07 (0.1% in THF at 30° C.); weight average particle size of the latex solids is 2300 angstroms; Maron stability values are not meaningful since the latex contains considerable coagulant before testing.

Example 17

To an evacuated one gallon autoclave is added 1910 ml. of an aqueous solution containing 10 grams of sodium carbonate,
20 grams of potassium peroxydisulfate,
10 ml. of 15 N ammonium hydroxide,
12 ml. of a 0.1 molar solution of ferric versenate, and
65 grams of polyoxyethylene nonylphenol having 10 moles of ethylene oxide per mole of nonylphenol.

The vessel is warmed to 30° C., at which time 644 grams of ethylene and 276 grams of vinyl chloride are added with stirring. The pressure inside the reaction vessel is 3000 p.s.i. and is maintained at this level by addition of vinyl chloride during the polymerization. The polymerization is started by adding 4.1 ml. of a 15% sodium formaldehyde sulfoxylate solution and is mainted by addition of 1.3 ml. portions at 15 minute intervals. The mixture is stirred at 400 r.p.m. during the entire polymerization. Over an eight hour period, a total of 43.4 additional ml. of sulfoxylate solution and 854 additional grams of vinyl chloride are added to the reaction vessel. After expiration of the eight hour period, stirring is discontinued and the latex allowed to separate from the unreacted monomer. At this time 25 grams of polyoxyethylene nonylphenol having 10 moles of ethylene oxide per mole of nonylphenol is added with stirring. The latex is subsequently vented to atmospheric pressure and the latex drained from the bottom of the vessel. A total of 3500 grams of latex having 1430 grams of copolymer solids is obtained. This represents a latex having 46% solids. The polymerized vinyl chloride content of the copolymer is 69%; percent conversion is 81% by weight based on the total monomer feed; specific viscosity is 0.08 (0.1% in THF at 30° C.); weight average particle size of the latex solids is 1990 angstroms; Maron stability of the latex is 0.005 gram.

Comparison of Examples 2 to 15 with Example 1 shows the significant improvement in mechanical stability achieved by adding various nonionic and anionic emulsifiers to a latex after its preparation and removal from the reactor.

Comparison of Examples 16 and 17 demonstrates the advantages of two additions of emulsifier, one addition being made after polymerization but before removal of the latex from the reactor. The latex of Example 16 has an unusually high latex viscosity of 800 centipoises and a large particle size of 2330 angstroms. In addition, the latex contains a significant amount of coagulum. In contrast, the latex of Example 17 (employing a pre- and post-addition of emulsifier) has a suitable latex viscosity of 50 centipoises, a particle size of 1990 angstroms, and no coagulum. Further, its mechanical stability is excellent. Because of these properties, the latex of Example 17 is a considerably better material to use as a pigment binder and barrier coating.

What is claimed is:

1. In a process for preparing stable ethylene/vinyl chloride copolymer latices, said copolymer having a polymerized vinyl chloride content from about 60 to about 85% by weight of said copolymer, by adding to an ethylene-vinyl chloride monomer system a nonionic emulsifying agent having a HLB value of from about 10 to about 17 or an anionic emulsifying agent having a HLB value of at least about 10, the improvement comprising adding to said monomer system prior to polymerization from about 15% to about 95% by weight of the theoretical amount necessary to provide a monomolecular layer on the polymer solids of said emulsifying agent, and adding after polymerization a second quantity of emulsifying agent sufficient to bring the total emulsifier content to from about 25% to about 150% of said theoretical amount.

2. A process according to claim 1 wherein the pre-polymerization addition of emulsifying agent ranges from about 25% to about 75% of the theoretical amount necessary to provide a monomolecular layer on the polymer solids.

3. A process according to claim 1 wherein the total emulsifier content ranges from about 50% up to about 100% of the theoretical amount necessary to provide a monomolecular layer on the polymer solids.

4. A process according to claim 1 wherein an anionic emulsifying agent is used for both the pre-polymerization addition and for the post-polymerization addition of emulsifying agent.

5. A process according to claim 1 wherein a nonionic emulsifying agent is used for both the pre-polymerization addition and for the post-polymerization addition of emulsifying agent.

6. A process according to claim 1 wherein an anionic emulsifying agent is used for the pre-polymerization addition and a nonionic emulsifying agent is used for the post-polymerization addition.

7. A process according to claim 1 wherein a nonionic emulsifying agent is used for the pre-polymerization addition and an anionic emulsifying agent is used for the post-polymerization addition.

8. A process according to claim 1 wherein said anionic emulsifying agent is selected from the group consisting of sodium dodecylbenzenesulfonate and ammonium dodecylbenzenesulfonate.

9. A process according to claim 1 wherein said nonionic emulsifying agent is selected from the group consisting of polyoxyethylenenonylphenols having from 2 to 40 moles of ethylene oxide per mole of nonylphenol and polyoxyethylene tridecanols having from 2 to 40 moles of ethylene oxide per mole of tridecanol.

10. A process according to claim 1 wherein said emulsifying agent has a HLB value of from about 14 to about 17.

11. In a process for preparing stable ethylene/vinyl chloride copolymer latices, said copolymer having a polymerized vinyl chloride content from about 60 to about 85% by weight of said copolymer, by adding to an ethylene-vinyl chloride monomer system a nonionic emulsifying agent having a HLB value of from about 10 to about 17 or an anionic emulsifying agent having a HLB value of at least about 10, the improvement comprising adding to said monomer system prior to polymerization from about 1% to about 8% by weight of the polymer solids subsequently to be formed, and adding after polymerization a second quantity of emulsifying agent sufficient to bring the total emulsifier content to from about 2% to about 15% by weight of the polymer solids.

12. A process according to claim 11 where the total emulsifier content ranges from about 4% to about 10% by weight of the polymer solids.

References Cited

UNITED STATES PATENTS

| | | | |
|---|---|---|---|
| 3,296,162 | 1/1967 | Mantell et al. | |
| 3,296,170 | 1/1967 | Burkhart et al. | |
| 2,422,392 | 6/1947 | Brubaker et al. | 260—87.5 |
| 2,449,489 | 9/1948 | Larson | 260—87.5 |

MURRAY TILLMAN, *Primary Examiner.*

J. L. WHITE, *Assistant Examiner.*